April 3, 1956        B. GOLDBERG        2,740,361
ANCHOR FOR LADING STRAPPING
Filed April 28, 1951        6 Sheets-Sheet 1
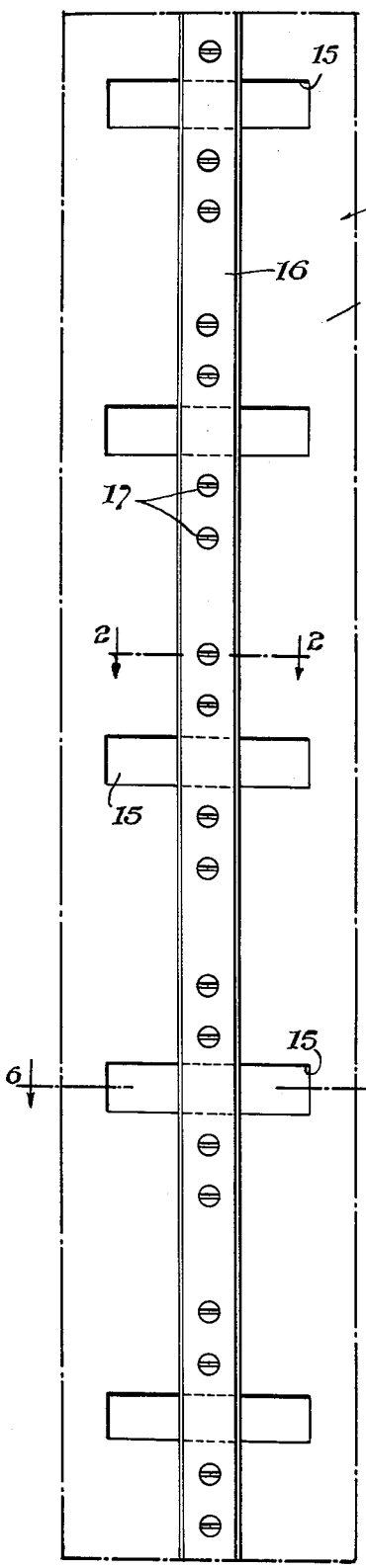
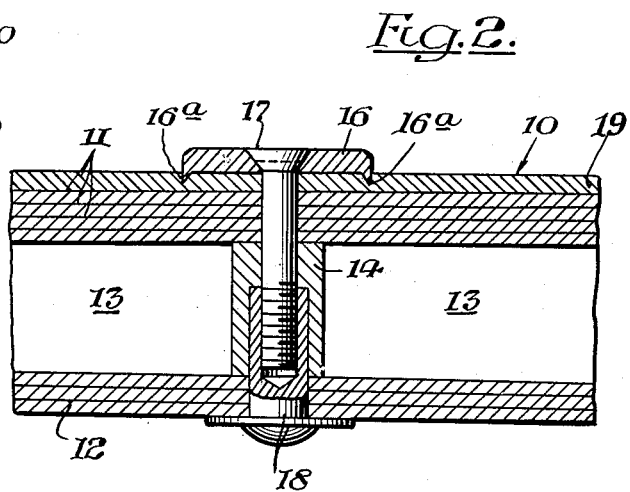
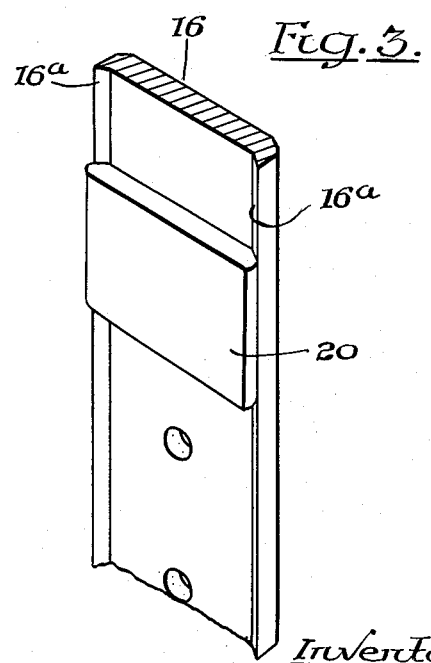
Inventor:
Bertrand Goldberg
by his Attorneys,
Darby & Darby.

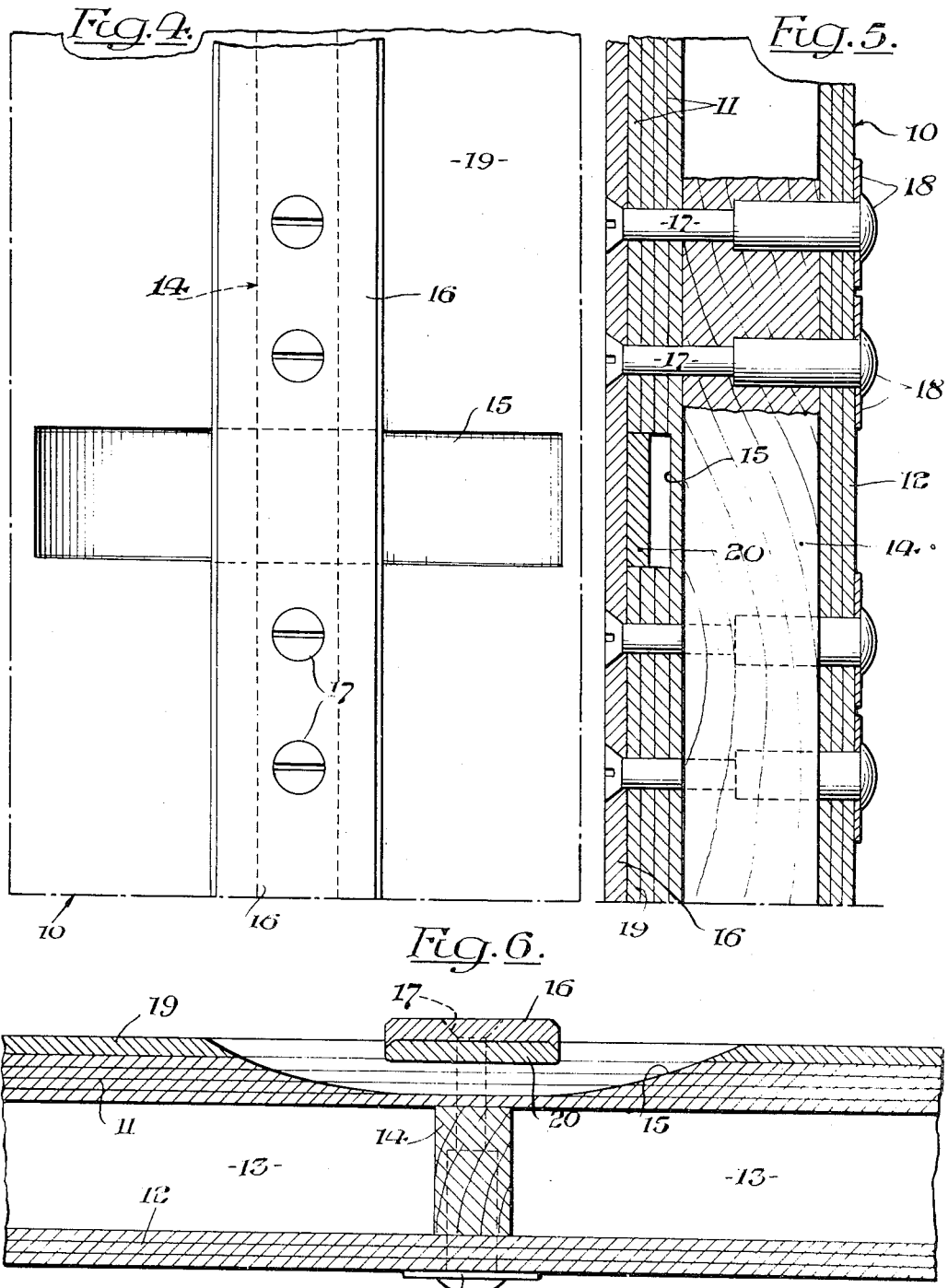

April 3, 1956     B. GOLDBERG     2,740,361
ANCHOR FOR LADING STRAPPING
Filed April 28, 1951     6 Sheets-Sheet 3
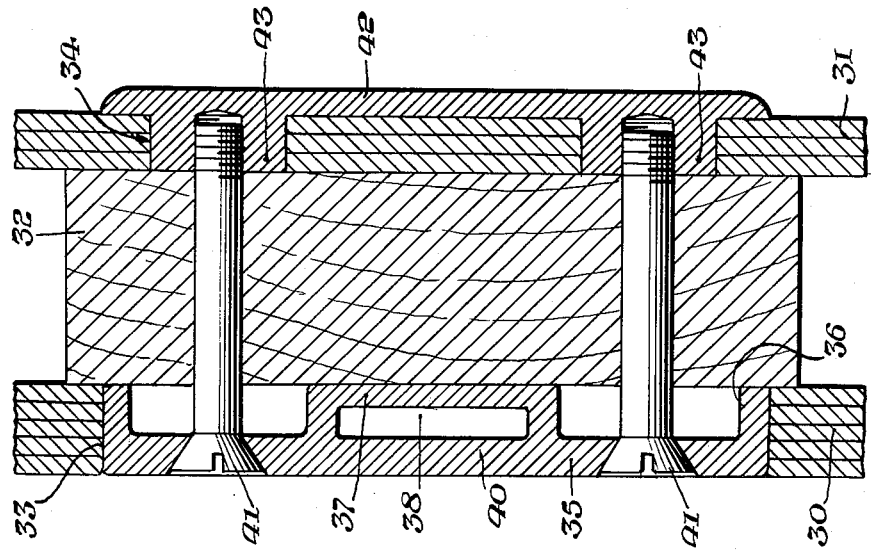
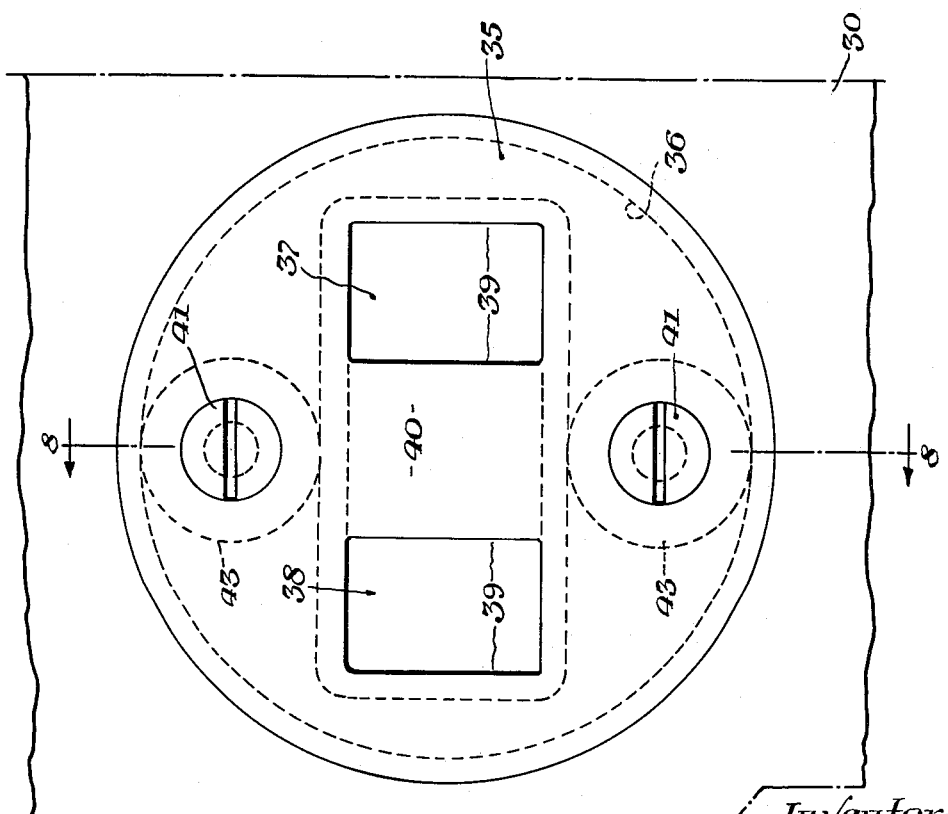
Inventor:
Bertrand Goldberg
by his Attorneys.
Darby Darby April 3, 1956  B. GOLDBERG  2,740,361
ANCHOR FOR LADING STRAPPING
Filed April 28, 1951  6 Sheets-Sheet 4
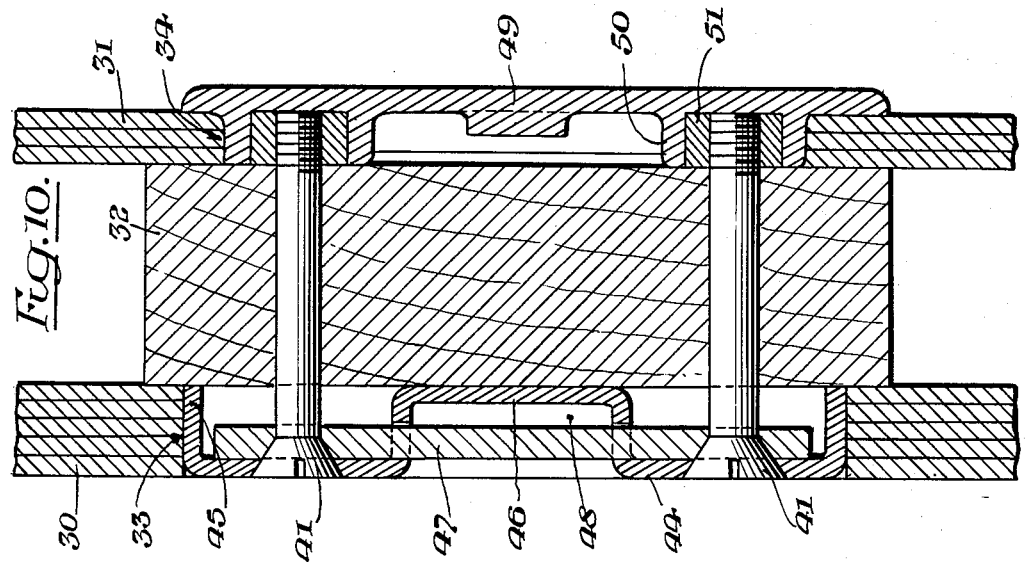
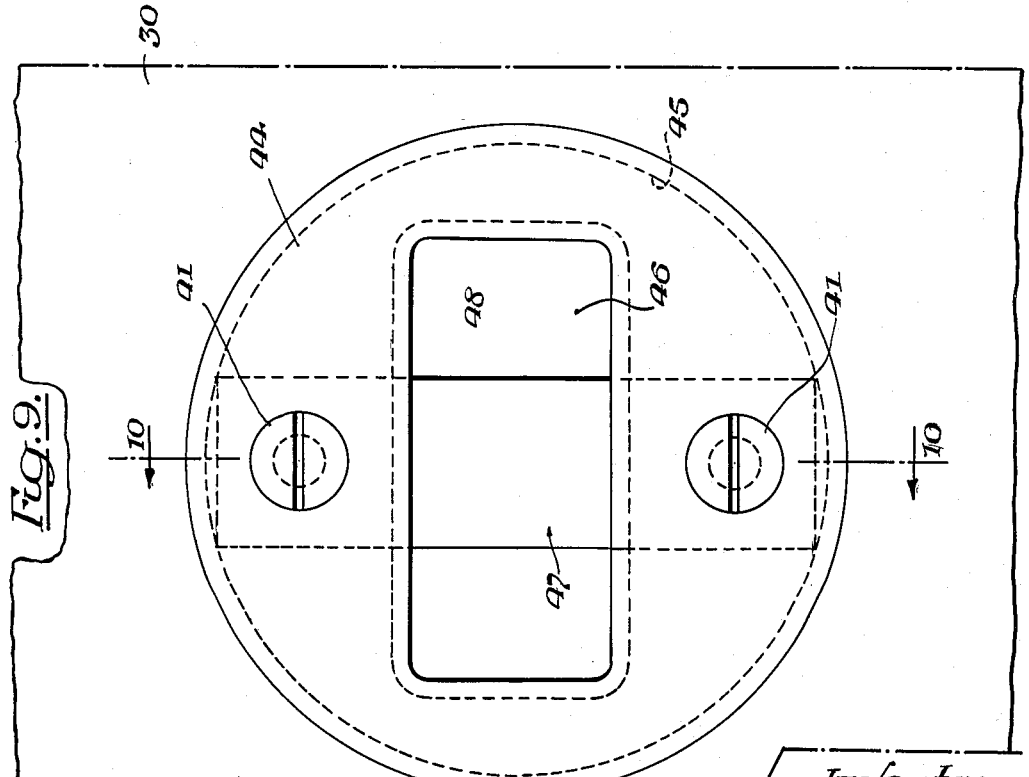
Inventor:
Bertrand Goldberg
by his Attorneys,
Darby & Darby April 3, 1956                B. GOLDBERG                 2,740,361
                         ANCHOR FOR LADING STRAPPING
Filed April 28, 1951                                     6 Sheets-Sheet 5
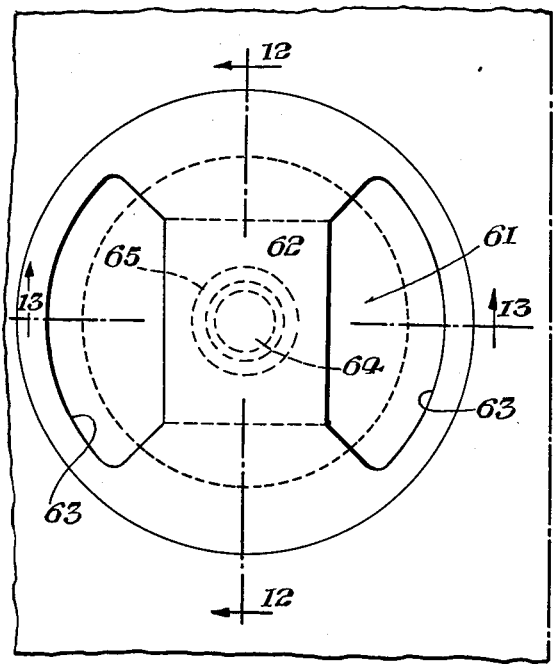
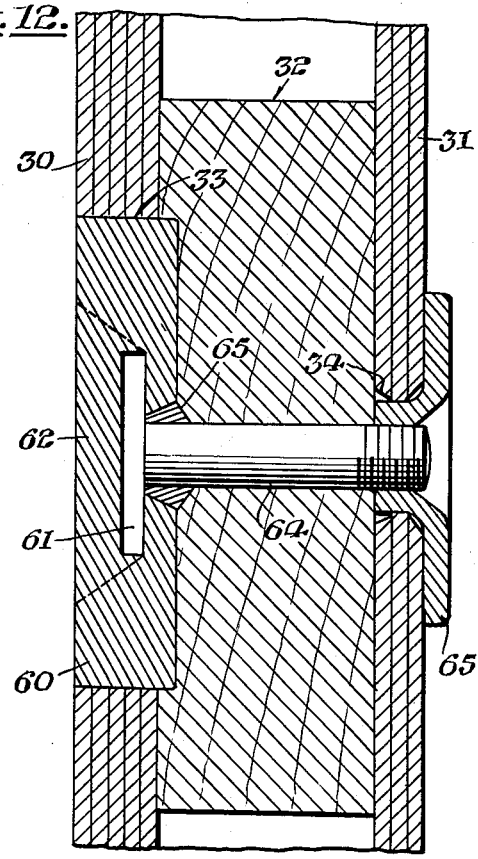
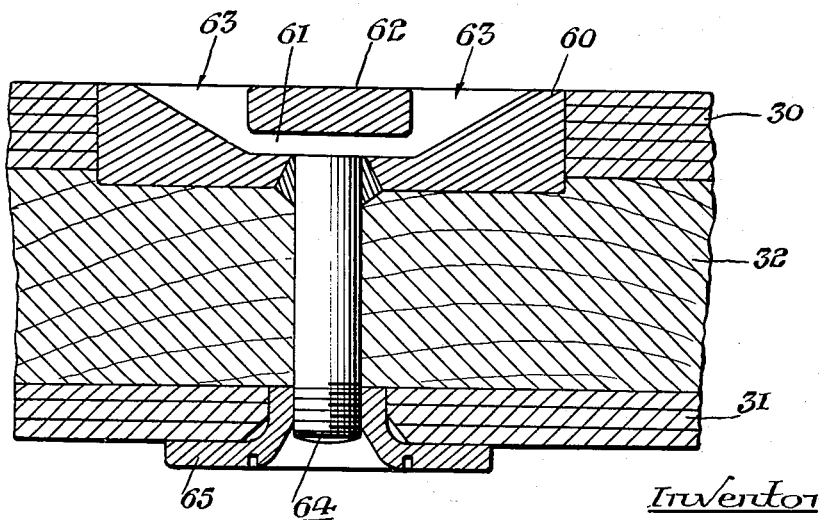
Inventor:
Bertrand Goldberg
by his Attorneys
Darby & Darby April 3, 1956   B. GOLDBERG   2,740,361
ANCHOR FOR LADING STRAPPING
Filed April 28, 1951   6 Sheets-Sheet 6

Inventor:
Bertrand Goldberg
by his Attorneys
Darby & Darby

United States Patent Office 2,740,361
Patented Apr. 3, 1956

2,740,361

ANCHOR FOR LADING STRAPPING

Bertrand Goldberg, Chicago, Ill., assignor, by mesne assignments, to U. S. Industries, Inc., a corporation of Delaware Application April 28, 1951, Serial No. 223,501

2 Claims. (Cl. 105—369)

This invention comprises novel forms of anchors to which the lading in vehicles such as railway cars, trucks and the like is anchored so as to hold the lading in transit.

Specifically this invention relates to devices to be built into vehicle bodies of wood so as to efficiently distribute the forces transmitted thereto by the lading strapping into the vehicle body. Wooden vehicle bodies of the type in mind are of laminated wood such as disclosed in my copending application Serial No. 151,883, filed March 25, 1950 and entitled Wood Cellular Laminated Railway Car.

It is proposed in that application to construct vehicle bodies of shells consisting of panels constructed of inner and outer layers of plywood, adhesively united by a plurality of intersecting separators lying therebetween. An important object of this invention is to provide strapping anchors for use in such laminated structures by means of which the forces are transmitted through the anchors directly into the laminated shell and substantially independently of the fastening devices by means of which the anchors are attached to the shell.

A more specific object of the invention is to provide strapping anchors which are simple in structure, inexpensive to manufacture, and adapted to mass production methods.

Another object is to provide anchors of this type which are neat in appearance and lie flush with the face of the wall in which they are attached or which project but a minimum distance above that surface to eliminate obstructions within the vehicle body by reason of their use.

Another object of the invention is to provide anchors which are easy to install and are of such rugged construction as to minimize and substantially eliminate maintenance costs.

Still another object of the invention is to provide anchoring devices to which the strapping can be quickly and easily attached and detached.

Other and more detailed objects of the invention will be apparent from the following description of the several embodiments of the invention illustrated in the attached drawings to indicate the scope of application of the novel subject matter comprising the invention.

In the accompanying drawings:

Figure 1 shows a portion of a laminated wall panel viewed in elevation from the side which will be on the interior of the space formed by the vehicle body, and showing one form of strapping anchor in accordance with this invention;

Figure 2 is a cross-sectional view taken on the line 2—2 of Figure 1;

Figure 3 is a perspective view from the underside of an anchor in accordance with this invention in the form of a bar having a configuration to provide load bearing or stress distributing surfaces for transmitting the stress uniformly into the wall panel;

Figure 4 is an enlarged elevational view similar to Figure 1 of a portion of the anchor;

Figure 5 is a vertical, central, cross-sectional view through the anchoring device;

Figure 6 is a cross-sectional view taken on the line 6—6 of Figure 1;

Figure 7 is an elevational view of the inner wall of a vehicle body showing another form of anchoring device as a casting;

Figure 8 is a cross-sectional view taken on the line 8—8 of Figure 7;

Figure 9 is a view similar to Figure 7, showing a modified anchoring device in the form of a stamping;

Figure 10 is a cross-sectional view taken on the line 10—10 of Figure 9;

Figure 11 is a front elevational view similar to Figure 7 of still another anchor in the form of a casting in accordance with this invention;

Figure 12 is a cross-sectional view taken on the line 12—12 of Figure 11;

Figure 13 is a cross-sectional view taken on the line 13—13 of Figure 11;

Figure 14:
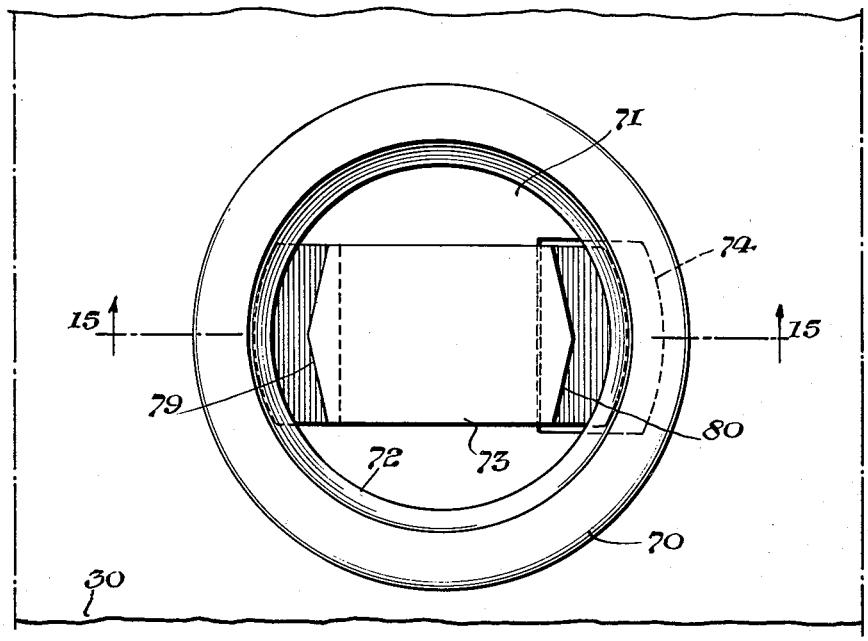
Figure 14 is a view similar to Figure 7 of a still further modified form of anchor in which the part to which the strap is attached is rotatable with respect to the main body of the anchor.

It is a common expedient in the transportation art to provide vehicle bodies such as railway cars, trucks and the like with anchoring devices on the interior thereof by means of which straps which hold the lading in place are fastened under tension. The use of metal strapping to fasten the lading in place to prevent it shifting in transport is growing rapidly. Such strappings while more commonly used with ladings which do not completely fill vehicle bodies, are also frequently used for full ladings in order to prevent shifting of the lading in transport and thereby minimize losses due to breakage and damage.

The more obvious form of anchor which is commonly used today consists of some structure which is bolted or otherwise attached in the interior of the vehicle body. The bolts are commonly relied upon to carry the loads created by the strappings so that the forces are concentrated on these bolts which frequently fail. The prime object of this invention is to provide strap anchoring devices for use particularly with vehicle bodies of wood which are constructed and associated with the wooden shell so as to directly distribute the forces created by the strapping into the wooden shell in an efficient and uniform manner. By such an arrangement little dependence is placed upon the bolts which attach the anchors in place to carry the load. In other words the forces created by the strapping are not concentrated in the bolts but are distributed by large bearing surfaces uniformly into the wooden structure, providing a more rugged and stronger combination.

In the above form of the device it will be seen that in addition to the distribution of forces into the wall of the structure as described, any component of pull on the strapping of the bar 16 which is other than normal to the wall 10, will apply a torque to the bar 16 about its longitudinal axis, with the result that one of the lips 16ᵃ, depending upon the direction of pull, will subject the material of the wall 10 to compressive stresses in a direction at right angles thereto. However, these compressive stresses will be well distributed.

In the form of anchor shown in Figures 1 to 6 inclusive, provision is made for attaching a plurality of straps at various levels vertically of the vehicle body by means of a single anchoring device. This device, as well as the others herein disclosed, is particularly adapted for use with wooden vehicle bodies and particularly those of laminated structure, a portion of which is illustrated in the various figures. The body is composed of a plurality of panels united to form the closed space of the vehicle body. These panels consist of an inner plywood layer 11 and an outer plywood layer 12 adhesively bound to a plurality of wooden separator straps comprising abutting or interlocking horizontal separators 13 and vertical separators 14. These elements are adhesively bonded together to form a very strong rugged structure. It will be apparent that the details of panel construction can be widely varied, some of which variations are indicated in the above mentioned application. The problem is to provide strap anchors for a construction of this type which will concentrate the loads in the paneling, but will widely distribute them therein. Furthermore, as stated above, the bolts by means of which the anchoring devices are attached to the panels do not carry the major portion of the load.

As illustrated in these drawings, the anchoring device consists of a steel bar 16 which extends vertically within the vehicle body, preferably from the floor to the ceiling. A plurality of these bars are strategically placed on the inner faces of the body walls, including the floor, and when desirable the ceiling. The bar 16 is of generally rectangular cross-section, but its offset outer longitudinal edges are crimped or rolled downwardly to form permanent flanges or lips 16$^a$. In the form shown these lips are generally of triangular cross-section, but the important thing is that they project outwardly beyond the outer face of the strap a substantial distance so that when they are attached in place by means of the through bolts 17 and the nuts and washers 18, they bite into the wood or outer surface of the panel, as clearly shown in Figure 2. It will be seen then that the bar 16 throughout its length is provided with the lips or flanges 16$^a$ which cut into the surface of the wall, floor or ceiling panel throughout their length. A plurality of through-bolts 17 are provided so as to tightly clamp the bar against the wall face. The anchoring device is preferably mounted on the panel so that the bolts will pass through vertical separators 14, thus providing a firm separator for the plywood layers 11 and 12 throughout the clamping area. This prevents the crushing or distortion of the panel such as might occur if the bolts pass through the panel at an unsupported area such as provided by the intersecting separators 13 and 14. It will be understood that the vertical separators 14 run from the floor to the ceiling in the case of a side wall panel, and from side wall to side wall in the case of a floor or roof panel.

As indicated in Figures 1 and 2, the inner surface of the panel may, if desired, be provided with a better wearing material than wood, such as for example the layer 19. This layer may be made of any one of a number of available sheathing materials such as pressed wood board, as for example "Masonite," fiber or other long wearing surfacing. As shown in several of the figures the wall panel is routed out to form pockets 15 spaced in a vertical direction and extending transversely of the bar 16 so that the metal strapping can be passed around the bar at spaced points and fastened in any well known manner. To strengthen the bar at the strapping points a steel plate 20 is preferably welded to the inner face of the bar at each of the pockets 15. With the particular construction shown it is apparent that these plates 20 also cover up the sharp edges of the lips 16$^a$ at the openings which might act to cut the strapping under stress.

It is common practice to attach the strapping to the anchors whenever possible, so as to transmit their load or the major portion thereof to the anchors in a direction parallel to the wall of the vehicle body. Under these conditions it will be seen that instead of the bolts taking the major portion of the stresses they are transmitted directly into the wall panels through the large load bearing surfaces provided by the lips 16$^a$ which are seated in the material of the panel.

With this structure a plurality of fastening points are provided by a single anchor. This arrangement facilitates relatively rapid installation for this reason.

However, there are many cases where individual anchors are desirable, notwithstanding the normally greater cost of installation. At the present time the cost of installing individual anchors is outweighed, however, by the cost of steel. Furthermore, by using individual anchors a wide latitude in the field of mounting is permitted. One form of individual anchor is shown in Figures 7 and 8. The panel in this case may be considered to be a floor panel for a wooden vehicle body, which panel is frequently constructed differently from the wall and ceiling panels, as is clear from the above mentioned application.

A portion of the floor panel is shown comprising the inner plywood layer 30 and the outer plywood layer 31, provided at the point of mounting of the anchor device with a spacing block 32 of wood adhesively secured in place. The main body of the anchor consists of a metal disc 35 which can be in the form of a shallow casting having a peripherial flange 36. The disc could be of uniform thickness throughout, or have a relatively thinner wall providing the flange 36 as illustrated. The inner plywood layer 30 is provided with a circular opening 33 in which the disc 35 fits snugly, as shown in Figure 8. As illustrated, the depth of the disc at the flange is substantially equal to the thickness of the plywood layer 30.

The central diametral portion of the disc is of full thickness and is provided with a cavity 38 having the bottom wall 37. A pair of openings 39 in the outer wall of the cavity provide access thereto and form an integral bridge 40. A pair of diametral bolt holes are provided in which through-bolts 41 are mounted. Another metal disc 42 is mounted on the outer face of the plywood layer 31 and is provided with a pair of internally threaded bosses 43 which lie in a pair of diametrically aligned holes in the plywood layer 31. These bosses are arranged to receive the bolts 41 which threadedly engage them, as clearly shown in Figure 8.

When the bolts 41 are drawn up tight, it will be seen that the separator block 32 prevents crushing of the floor panel and serves to position the anchoring disc 35 so that it will lie flush with the inner face of the plywood layer 30.

It will be seen that this type of anchoring device, parts of which may be castings, is usually mounted at any desired point in the floor, roof or wall panels by cutting one circular hole 33 and two small holes 34. Thus it is easily mounted and when in place is flush with the inner wall of the body, distinguishing it from the previous structure which projects inwardly of the inner face of the wall, although not to an important distance. The construction shown in Figures 7 and 8 has a very large load bearing surface engagement with the wall panels so that a substantial portion of the strap stresses are transmitted into the panels with reduced stress on the bolts 41. In the case of vertical pull on this device the stresses in tension through the bolts will pass into the relatively large disc 42 which will distribute these loads over a wide area of the panel.

The anchor of Figures 9 and 10 is generally similar to that of the previous form, but is constructed so that it may be made of stamped and molded parts. It is quite similarly mounted. In this case the inner member consists of a disc of uniform wall thickness comprising the outer portion 41 and the peripherial flange 45. A diametral portion is deformed inwardly to form a channel 48 having the bottom wall 46. This conformation can readily be stamped from a disc of metal of suitable thickness. Extending transversely of the cavity 48 is a relatively heavy metal bar 47 which lies behind the portion 44 extending through diametrically aligned slots in the side walls of the cavity 48 as clearly shown in Figure 10.

These parts are welded together in any suitable manner. The disc is mounted in an aperture 33 in the plywood layer 30, as before. Clamping disc 49 can be made of any suitable material and in any suitable manner, as for example it may be made of a plastic material and can thus be easily molded to the proper form. As shown it has a pair of diametrically arranged bosses 50 which have molded therein metal inserts 51 which are threaded to receive the through-bolts 41.

This construction has all of the advantages of the previous construction but it is less expensive to manufacture. This form of device illustrates the importance of the large bearing surface of the disc 44 in the wall 30 by reason of the fact that the plate 47 can be made of a plastic and yet is strong enough to carry the stresses. As explained, most of the stress is transmitted in a direction parallel to the wall and through the anchoring device into the wall at the flanges 45. It will be seen that any tension in the bolts 41 will be transmitted to the inserts 51 which are picked up by the separator 32 so that there is little danger of them being pulled out of the plastic disc 49.

The form of anchor shown in Figures 11 to 13 inclusive again involves a structure suitable for casting. It consists of a metal disc 60 at least as thick as the plywood sheet 30, or as illustrated in Figure 12, still thicker so as to be recessed into the separator block 32. This disc has a cavity 61 opening at the face of the disc at diametrically arranged points, as shown at 63 in Figure 11. This leaves a center cross piece 62 around which the strap can be fastened. As illustrated, a threaded centrally positioned stud 64 is welded, as indicated at 65, to the block 60. This threaded end engages an internally threaded boss on a disc 65 mounted on the outer face of the plywood sheet 31. The disc 65 can be constructed in any suitable manner so that it can be readily tightened, as for example it may be provided with spanner wrench openings. This form of device is exceedingly simple in structure and therefore relatively inexpensive to manufacture.

Figure 15:
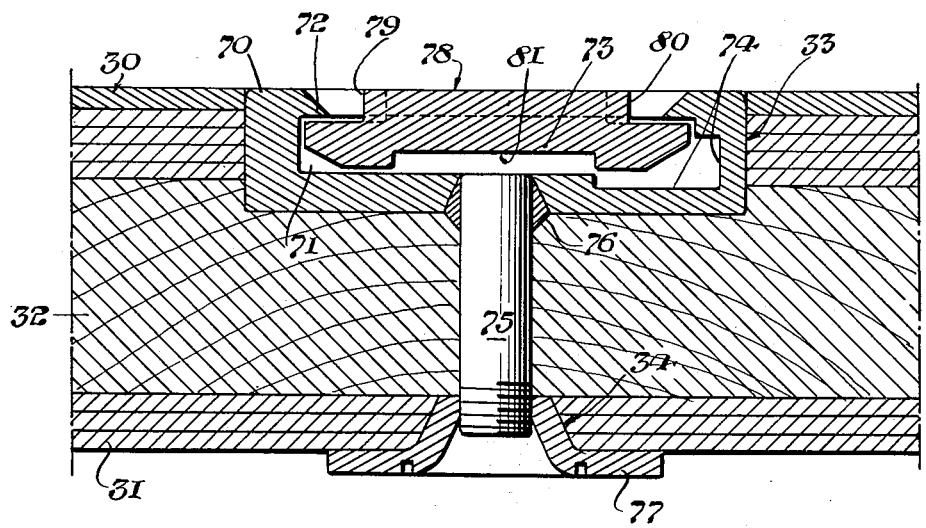
Figure 15 is a cross-sectional view taken on the line 15—15 of Figure 14.

Finally, there is illustrated in Figures 14 and 15 another form of strap anchor constructed so that the strap can be rotated on its longitudinal axis to facilitate proper positioning of the strap with respect to the lading. The floor, roof or wall panel section is shown, and is recessed as before. In this case the anchor is in the form of a circular body having a cylindrical cavity 71 opening on the outer face of the disc 70. The outer face of the disc overhangs the cavity as a result of the annular lip 72 which is formed integral with the body. One end of the cavity is provided with a radial recess 74, as clearly shown in the figures. The anchor body is provided with a threaded stud 75 which is welded thereto, as shown at 76 and is adapted to be connected to a threaded clamping plate 77 similar to that shown in Figure 13.

Rotatably mounted in the cavity is a diametrically extending metal member 73 which is provided with a raised central portion 78 forming a pair of diametrically opposed shoulders 79 and 80. The lips at the end of the bar 73 can thus lie under the peripheral flange 72 so that the bar may be rotated on the axis of the stud 75. The bar is undercut as shown at 81 in Figure 15, so that the strap can be easily passed therearound. The bar 73 can readily be removed when desired by depressing the end into the radial cavity 74 so that it can be shifted endwise a sufficient distance so that the lip at the opposite end of the bar will pass the flange 72. It will be seen from Figure 15 that the shoulder at the right hand of the undercut area 81 will pass the shoulder formed in the body 70 by the radial extension cavity 74 which is also, as shown in Figure 15, enlarged in an axial direction for this purpose. Thus the bar can be easily inserted and removed as desired.

In each of the devices of Figures 7 to 15 inclusive, as distinguished from the device of Figures 1 to 6 inclusive, tensioning of the strapping will tend to cause movement of the inner disc of the anchor in a direction parallel to the inside member of the panel, and the said inner member, adjacent the disc, is placed under compression in a direction parallel to the said inner member.

From the above description it will be apparent to those skilled in the art that the subject matter of this invention can be readily incorporated in many physical forms. In each, however, will be found a feature of construction whereby the bearing surface of the anchor in relation to the wall on which it is mounted is of substantial area so that all components of force applied thereto parallel to the wall will be distributed into the wall over a relatively large area and in a uniform manner. Thus the strain on the fastening devices such as the bolts is minimized, any pull along the axis of the bolts being in turn well distributed in the wall section by the relatively large bearing areas through which they engage these surfaces.

In view of the foregoing I do not desire to be strictly limited to the specific forms of devices illustrated, but rather by the scope of the appended claims.

What is claimed is:

1. In combination with a vehicle body wall of fibrous material having a plurality of spaced pockets formed therein, of an anchor device for strapping employed to hold the lading against movement in said body, comprising an elongated bar lying on the surface of said wall and extending across said pockets, said bar having sharpened flanges extending along its side edges on the side in contact with said wall, and a plurality of fastening devices clamping said bar to the face of said wall so as to embed said sharpened flanges into the fibres thereof to provide an increased bearing surface between said bar and wall.

2. In the combination of claim 1, plates attached to said bar and overlying the sharpened flanges at said pockets to reinforce the bar and mask its sharpened edges.

References Cited in the file of this patent

UNITED STATES PATENTS

| | | |
|---|---|---|
| 1,466,035 | Thomas | Aug. 28, 1923 |
| 2,020,270 | Wilson et al. | Nov. 5, 1935 |
| 2,028,574 | Tobin et al. | Jan. 21, 1936 |
| 2,051,381 | Kivlin | Aug. 18, 1936 |
| 2,170,913 | Rowe | Aug. 29, 1939 |
| 2,174,988 | Lundvall | Oct. 3, 1939 |
| 2,245,611 | Schultz | June 17, 1941 |
| 2,479,870 | Rundquist | Aug. 23, 1949 |
| 2,511,620 | MacClements | June 13, 1950 |
| 2,559,240 | Wiggin | July 3, 1951 |
| 2,570,368 | Moon | Oct. 9, 1951 |